US005662831A

United States Patent [19]
Chadha

[11] Patent Number: 5,662,831
[45] Date of Patent: Sep. 2, 1997

[54] LUMINESCENT PHOSPHOR AND METHODS RELATING TO PRODUCTION THEREOF

[75] Inventor: Surjit S. Chadha, Meridian, Id.

[73] Assignee: Micron Display Technology, Inc., Boise, Id.

[21] Appl. No.: 655,884

[22] Filed: May 31, 1996

[51] Int. Cl.$^6$ .......................... C09K 11/78; C09K 11/84
[52] U.S. Cl. ..................... 252/301.4 R; 252/301.6 R; 252/301.4 S
[58] Field of Search .................. 427/64; 313/467, 313/468, 503; 252/301.4 R, 301.6 R, 301.4 S

[56] References Cited

U.S. PATENT DOCUMENTS 5,413,736  5/1995  Nishisu et al. .............. 252/301.4 R
5,455,489  10/1995  Bhargava .................... 313/468

*Primary Examiner*—Melissa Bonner
*Attorney, Agent, or Firm*—Seed and Berry LLP

[57] ABSTRACT

There is disclosed a luminescent phosphor having an average particle size of less than about 3 microns, as well as a bright luminescent phosphor having an average particle size of less than 5 microns and a luminescence of about 10–12 au. The bright luminescent phosphor is made by combing a yttrium or gadolinium host material with a europium dopant in a liquid to form a slurry, and then pulverizing the slurry to less than about 3 microns in average particle size. The pulverized slurry is then heated to yield the bright luminescent phosphor. The bright luminescent phosphor is particularly suited for use in high resolution display screens, and in screens which require low power consumption, such as laptop computers.

37 Claims, 1 Drawing Sheet

LUMINESCENT PHOSPHOR AND METHODS RELATING TO PRODUCTION THEREOF

This invention was made with Government support under Contract No. DABT 63-93-C-0025 awarded by Advanced Research Projects Agency (ARPA). The Government has certain rights in this invention.

TECHNICAL FIELD

The present invention relates generally to luminescent phosphor and, more specifically, to a method of producing luminescent phosphor for use in field emission displays and products relating thereto.

BACKGROUND OF THE INVENTION

Many devices, such as high definition televisions and computer screens, utilize luminescent phosphor as a coating on a display screen for producing images. Such displays typically have an electron source that directs a stream of electrons toward the luminescent phosphor coating. When electrons impinge upon individual phosphor picture elements or pixels on the screen, they cause the energy level of the phosphor to increase to an excited state. When the energy level declines from this excited state, the pixels emit photons. These photons pass through the screen to be seen by the viewer as a point of light. An array of these pixels operating under controlled excitation produce a visible image.

Typically, the cathode ray tube (CRT) has been used as a display for many applications. The CRT has many disadvantages due to its size, power consumption and bulk, that make it unacceptable for many applications, including laptop computers. An emerging technology that overcomes many of the problems of conventional CRT displays is the field emission display (FED). The FED consists of an array of cold cathode emitter tips arranged on a substrate and connected to the negative terminal of a power supply through an addressing scheme. Each of the emitter tips is surrounded by a gate that is connected through an addressing scheme to the positive terminal of the power supply. When an electric field is placed between the gate and the emitter tip, the emitter tips release a stream of electrons. Each of the individual emitter tips or sets thereof is individually addressable so that any combination of them can be activated at a given time. A screen coated with a layer of luminescent phosphor is located opposite the array of emitter tips. When an individual emitter tip is selected, it emits a stream of electrons forming an emission current that impinges upon the corresponding phosphor picture element or pixel on the screen.

Many applications for which the FED is well suited, such as a laptop computer, viewcam finder and head mounted display, require low power consumption. The power consumption of the FED is related to the electric field that must be placed between the gate and the emitter tip in order to produce the required emission current. Very small luminescent phosphor particles can be more efficient than larger particles since they pack more densely on the screen and have larger surface area per unit weight, and thus are more likely to be excited by any single electron.

It is known in the art to produce luminescent phosphor by a multi-step process. In a first step, yttrium oxide is combined with europium oxide and the mixture ground to an average particle size of approximately 5 microns. At this point, the ground particles are not luminescent. The particles can be made luminescent by heating them to a very high temperature (around 1150° C. or higher). However, in addition to becoming luminescent, the phosphor particles grow to an average particle size of about 8 microns. This size is too large for many applications. While these luminescent phosphor particles can be milled to a smaller particle size, this process causes a substantial loss in the luminescence of the particles.

A need exists in the industry for a process to make a luminescent phosphor having both a very small particle size and a high luminescence, as well as a need for products utilizing such luminescent phosphor particles. The present invention fulfills these needs, and provides further related advantages.

SUMMARY OF THE INVENTION

In brief, this invention provides a method of manufacturing luminescent phosphor having an average particle size of less than about 3 microns, or a very fine luminescent phosphor having an average particle size of less than about 1 micron, either having a luminescence of at least about 0.28 au. The method includes combining a yttrium or gadolinium host material and a europium dopant in a suitable liquid to form a slurry, and then pulverizing the slurry to form a luminescent phosphor or very fine luminescent phosphor, depending on the pulverization time. In a preferred embodiment, the host material is yttrium oxide, the dopant is europium oxide, and isopropanol is employed as the liquid. Pulverization may be performed in a high frequency, vibrating mill. The luminescent phosphor or the very fine luminescent phosphor may be heated to a temperature sufficient to further increase the luminescence thereof, yielding bright luminescent phosphor having a luminescence ranging from about 1 au to about 12 au and an average particle size typically less than about 5 microns.

In another embodiment of this invention, a bright luminescent phosphor is disclosed having an average particle size of less than about 5 microns, preferably less than about 2 microns, and more preferably less than about 1 micron, and a luminescence of about 1–12 au, preferably about 8–12 au and more preferably about 10–12 au. Such material is particularly suited for use in display screens which benefit from low power consumption and/or high resolution, including (but not limited to) an FED and plasma display.

In a further embodiment, a display screen is disclosed having at least a portion thereof coated with a luminescent phosphor of this invention. In still further embodiments, a field emission display and a method of making the same are disclosed, wherein the field emission display includes a screen having at least a portion thereof coated with a luminescent phosphor of this invention.

These and other aspects of this invention will become evident upon reference to the following detailed description and drawing.

DETAILED DESCRIPTION OF THE INVENTION

Figure 1:
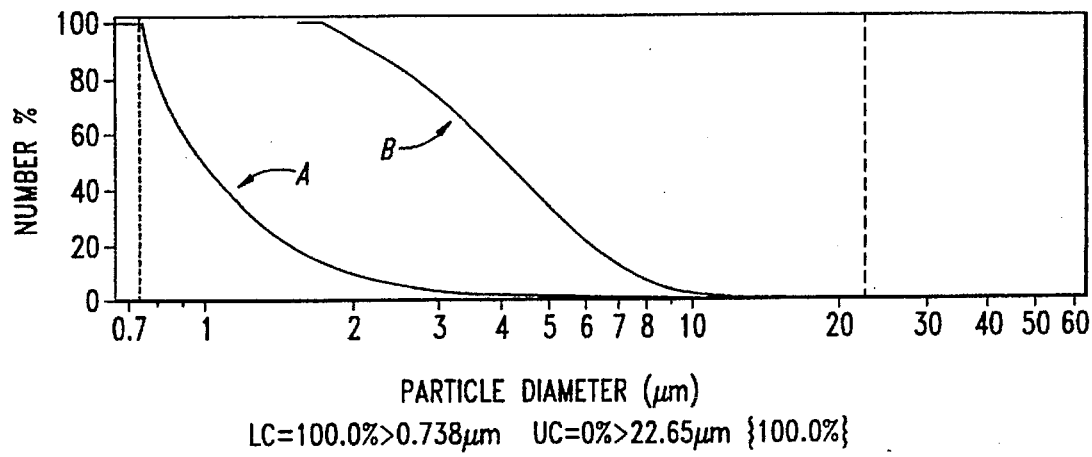
FIG. 1 compares the particle size distribution of a luminescent phosphor according to this invention and a commercial luminescent phosphor having about equal brightness.
Figure 2:
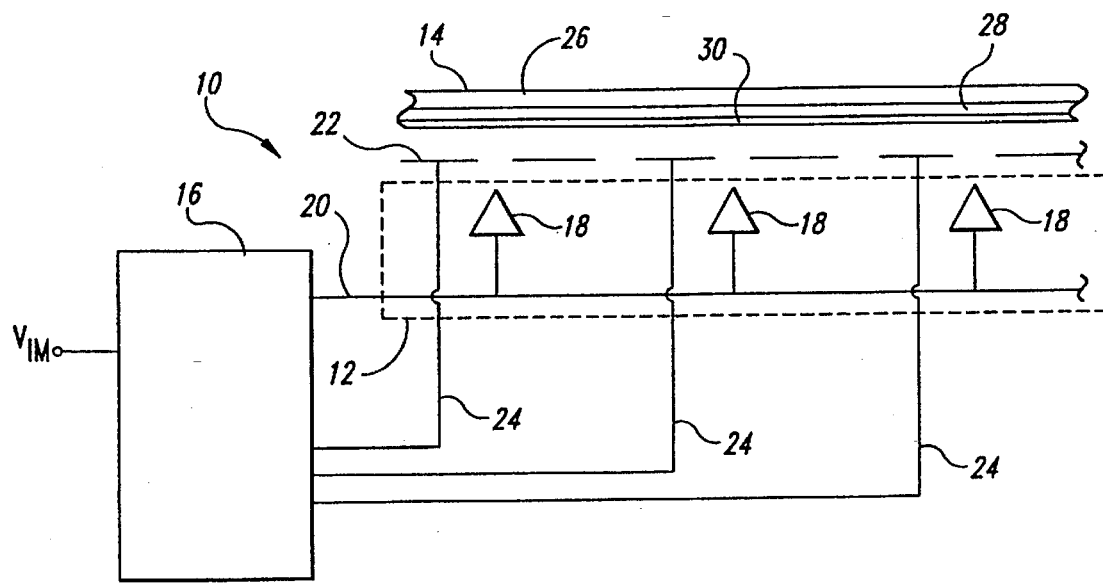
FIG. 2 is a diagrammatic representation of a portion of a field emission display including a luminescent phosphor according to this invention.

As mentioned above, the present invention is directed to a method for producing luminescent phosphor having an average particle size of less than about 3 microns, as well as very fine luminescent phosphor having an average particle size of less than about 1 micron. This invention is also directed to a method for producing bright luminescent phosphor having an average particle size of less than about 5 microns, as well as very fine bright luminescent phosphor having an average particle size of less than about 1 micron, where the bright luminescent phosphor and the very fine bright luminescent phosphor have luminescence of greater than about 1 au. This invention is also directed to the use of the luminescent phosphors prepared by the invention in the manufacture of display screens, and to the display screens themselves as well as products incorporating the display screens.

It has surprisingly been found that pulverizing a slurry of a gadolinium and/or yttrium compound in combination with a europium compound, to an average particle size of less than about 3 microns, typically about 0.5 microns to about 3 microns, yields a luminescent phosphor having a luminescence ranging from about 0.28 au to about 1 au. Thus, according to the invention, luminescent phosphor can be made by a room temperature process (heating is not necessary), using pulverizing equipment and commercially available starting materials.

According to a preferred embodiment of the invention the slurry of gadolinium or yttrium compound and europium compound is pulverized to form a very fine luminescent phosphor having an average particle size of less than about 1 micron. Surprisingly, little or no loss in luminescence is observed after the extended pulverization needed to reach these very small particle sizes. The prior art reports that the luminance output of phosphors decreases with extended pulverization, (see, e.g., S. S. Chadha, "Powder electroluminescence," Chapter 6 in *Solid State Luminescence, Theory, Materials and Devices*, Kitai, A. H., editor, Chapman & Hall).

The luminescent phosphor and the very fine luminescent phosphor prepared by the invention may be heated to thereby increase the luminescence thereof. Typically, some increase in the average particle size of the phosphor occurs upon its heating.

When the luminescent phosphor or the very fine luminescent phosphor is heated to a temperature ranging from about 800° C. to about 1700° C., preferably about 900° C. to about 1400° C., and more preferably to about 1000° C. to about 1250° C. for a time of about 0.5 hour to about 4, hour, preferably about 1 hr to about 1.5 hr, the resulting luminescent phosphor has a luminescence of greater than about 1 au, typically ranging from about 1 au to about 12 au, preferably about 8 au to about 12 au, and more preferably about 10 au to about 12 au (i.e., a bright luminescent phosphor is formed).

During the heating step, the average particle size of the luminescent phosphor increases, however typically remains less than about 5 microns. When the very fine luminescent phosphor is heated, it too increases in average particle size, however remains less than about 2 microns, preferably less than about 1 micron. The small particle size bright luminescent phosphor produced by this method is suitable for use in a variety of applications, including use as phosphor coatings in high resolution flat panel displays and FEDs.

The method of this invention involves the combination of a host material and a dopant in a suitable liquid medium to form a slurry. The host material is a gadolinium compound or a yttrium compound, where exemplary host materials are gadolinium oxide ($Gd_2O_3$), gadolinium oxysulfide ($Gd_2O_2S$), yttrium oxide ($Y_2O_3$), yttrium oxysulfide ($Y_2O_2S$) and yttrium vanadate. The dopant, which can also be referred to as an activator, is a europium compound, where exemplary dopants are europium oxide ($Eu_2O_3$), europium nitrate ($Eu(NO_3)_3$), europium chloride ($EuCl_3$), europium bromide ($EuBr_3$) and europium iodide ($EuI_3$). A preferred host material is yttrium oxide and a preferred dopant is europium oxide.

The liquid medium of this invention may be any low boiling point, inert liquid. Representative liquids include, but are not limited to, water and hydroxy-containing organic liquids (alcohols) such as methanol, ethanol and isopropanol. In a preferred embodiment, the liquid is isopropanol.

The slurry may be formed by adding suitable amounts of the host material and europium dopant to the liquid. The relative amount of yttrium or gadolinium to europium in the slurry is controlled by adding desired amounts of, for example, yttrium oxide and europium oxide to the liquid. The atomic ratio of yttrium to europium (Y:Eu) or gadolinium to europium (Gd:Eu) in the liquid ranges from about 99:1 to about 85:15. When the host material is a mixture of yttrium and gadolinium, the (Y+Gd):Eu atomic ratio also varies from about 99:1 to about 85:1. When yttrium oxide and europium oxide are used as the starting materials, this range may generally be achieved by mixing the yttrium oxide and europium oxide such that yttrium oxide is present in an amount ranging from 0.01% to 20% by weight, based on the weight of europium oxide in the slurry. An exemplary slurry of the invention contains about 10 parts solids (host material and dopant) and about 30 parts liquid, and a preferred slurry contains about 10 parts yttrium oxide, 0.5 parts europium oxide and about 30 parts isopropanol.

After the slurry has been formed, it is then pulverized to yield either a luminescent phosphor having a particle size of less than about 3 microns, or a very fine luminescent phosphor having an average particle size of less than 1 micron. The term pulverization is intended as a general term which encompasses all processes wherein force is applied to reduce the particle size of the host and dopant in the slurry. Thus, pulverization includes processes called micronization, grinding and milling. Pulverization of the slurry may be achieved by placing the slurry into a jar with some media, such as agate elements, and placing the jar on a high frequency vibrating mill. In a preferred embodiment, the high frequency vibrating mill is a McCrone Mill (McCrone Scientific Ltd., London, England) or a Fritsch Planetary Mill (Gilson Company, Inc., Worthington, Ohio).

It has been surprisingly found that after pulverization, the resulting luminescent phosphor and very fine luminescent phosphor are luminescent. In other words, pulverization alone (without heating) yields a luminescent material. This represents a novel approach to generation of luminescent phosphor, which is typically only luminescent following a heating or firing step.

While the very fine luminescent phosphor of this invention possesses both a desirably small particle size and luminescence, it is has been found that heating this luminescent phosphor can increase its luminescence. According to a preferred embodiment of the invention, the very fine luminescent phosphor is heated to a temperature ranging from about 800° C. to about 1700° C., preferably about 900° C. to about 1400° C., and more preferably to about 1000° C. to about 1250° C. for a time of about 0.5 hr to about 4 hr, preferably about 1 hr to about 1.5 hr. After heating the particle size of the very fine luminescent phosphor has increased, but typically remains less than about 2 microns, preferably less than about 1 micron, yielding a preferred very fine bright luminescent phosphor of this invention.

The luminescence of the bright luminescent phosphor generally ranges from about 1 au to about 12 au, preferably from about 8 au to about 12 au, and more preferably is about 10 au to about 12 au. A very fine bright luminescent phosphor having an average particle size of less than 1 micron and a luminescence of about 10 au to about 12 au can be prepared by the above-described process. It should be noted that unlike prior art processes, further milling or grinding of the luminescent phosphor is not required after it is heated. This is of central importance since existing techniques for the production of luminescent phosphor require grinding of the same to a small particle size after firing for use in, for example, high resolution displays. Such milling in existing techniques, however, substantially destroys luminescence.

It should also be noted that fluxes need not be used in the preparation of the very fine bright luminescent phosphor of the invention. According to prior art techniques, it is common to add fluxes such as sodium chloride, strontium fluoride and/or other salts to the phosphor during the grinding and/or firing steps. The use of fluxes is generally undesirable because, for example, they provide a further opportunity to contaminate the luminescent phosphor. The present invention avoids the need to use fluxes in preparing a luminescent phosphor, although fluxes could be used if desired.

FIG. 7 shows a display device 10 utilizing the luminescent phosphor of this invention. The display device 10 is a field emission display that includes an emitter substrate 12, a display screen 14, and a driving circuit 16. The emitter substrate 12 includes three emitter sets 18 coupled to a row line 20. Although the emitter substrate 12 is represented by only a single row of three emitter sets 18 for clarity of presentation, one skilled in the art will recognize that such emitter substrates 12 typically are formed from an array of many rows with each row having many emitter sets 18. Also, although the emitter sets 18 are represented by single conical emitters, one skilled in the art will recognize that such emitter sets 18 typically include several emitters that are commonly connected. Conductive extraction gates 22 are positioned above the emitter substrate 12. The extraction gates 22 are aligned along respective columns, each of which intersects all of the rows of emitter sets 18 on the emitter substrate 12. Each column of extraction gates 22 is connected to a respective column line 24.

The screen 14 is positioned opposite the emitter substrate 12 and extraction gates 22. The screen 14 includes a transparent panel 26 having a transparent conductive anode 28 on a surface facing the emitter substrate 12. A luminescent layer 30 coats the anode 28 between the anode 28 and the extraction gates 22. The luminescent layer 30 is formed from then luminescent phosphor prepared according to the instant invention. Methods for producing such display screens 14 employing luminescent phosphor are known in the art, and are suitably employed with the luminescent phosphor prepared according to the instant invention in general, the luminescent phosphor may be deposited on the interior surface of a screen using known techniques. Due to the very small particle size of the luminescent phosphor of the invention, very high resolution screens may be manufactured, and a thinner film of phosphor may be employed to form the luminescent layer 30, thus reducing the cost of the display screen. In addition, screens 14 having improved power consumption properties compared to screens made using luminescent phosphor produced by prior art techniques may similarly be manufactured. Both field emission displays and plasma displays may be prepared with the phosphors described herein.

In operation, selected ones of the column lines 24 are biased at a grid voltage $V_G$ of about 30–120 V and the anode 28 is biased at a high voltage $V_A$, such as 1–2 kV. If an emitter set 18 is connected to a voltage much lower than the grid voltage $V_G$, such as ground, the voltage difference between the column line 24 and the emitter set 18 produces an intense electric field between the extraction gate 22 and the emitter set 18 in a row intersecting the column. The electric field causes the emitter set 18 to emit electrons according to the Fowler-Nordheim equation. The emitted electrons are attracted by the high anode voltage $V_A$ and travel toward the anode 28 where they strike the luminescent layer 30, causing the luminescent layer 30 to emit light around the impact site. The emitted light passes through the transparent anode 28 and the transparent panel 26 where it is visible to an observer.

The intensity of light emitted by the luminescent layer 30 depends upon the rate at which electrons emitted by the emitter sets 18 strike the luminescent layer 30. The rate at which the emitter sets emit electrons is controlled by the electronic controller 16 in response to an image signal $V_{IM}$, which may be a television signal or other signal representing an image to be displayed.

The invention will now be illustrated in more detail by the following non-limiting examples, which demonstrate the advantageous properties of the present invention. Parts and percentages are by weight unless otherwise indicated.

EXAMPLE

A slurry was prepared by combining 10 g yttrium oxide, 0.5 g europium oxide and 30 mL isopropanol. These yttrium and europium oxides were obtained from HJD Chemicals, and were of very high purity, (i.e., greater than 99.99% purity). The isopropanol was of standard semiconductor grade, and can be obtained from many supply houses, for example, Aldrich Chemical Co., Milwaukee, Wis. This slurry was pulverized for 3 hours in a McCrone Mill, and then heated at 1000° C. for 1 hour followed by 2 hours at 1650° C. The brightness of the luminescent phosphor prepared by this method was equal to the brightness of commercially available luminescent phosphor that is commonly used in display devices, however the inventive phosphor had a smaller average (mean) particle size, as shown in FIG. 1.

In FIG. 1, the particle size distribution for the phosphor made according to this Example is labeled "A", while the commercially available phosphor is labeled "B". The Coulter Counter used to obtain the particle size distribution shown in FIG. 1 was used to characterize the distribution of the inventive and commercial luminescent phosphors as presented in the following Tables 1 through 3:

TABLE 1

Number Statistics (Geometric) for Phosphor A
(Calculations from 0.738 μm to 22.96 μm)

| | | | | | |
|---|---|---|---|---|---|
| Number | | 100% | | | |
| Mean: | | 1.123 μm | | | |
| Median: | | 0.992 μm | | | |
| Mean/Median Ratio: | | 1.132 | | | |
| Mode: | | 0.753 μm | | | |
| Spec. surf. area: | | 2.195 m²/ml | | | |
| % > | 10 | 25 | 50 | 75 | 90 |
| Size μm | 1.968 | 1.371 | 0.992 | 0.818 | 0.768 |

TABLE 2

Number Statistics (Geometric) for Phosphor B
(Calculations from 1.548 μm to 22.79 μm)

| | | | | | |
|---|---|---|---|---|---|
| Number | | 100% | | | |
| Mean: | | 4.0238 μm | | | |
| Median: | | 4.014 μm | | | |
| Mean/Median Ratio: | | 1.004 | | | |
| Mode: | | 3.733 μm | | | |
| Spec. surf area: | | 0.954 m²/ml | | | |
| % > | 10 | 25 | 50 | 75 | 90 |
| Size μm | 7.287 | 5.624 | 4.014 | 2.889 | 2.172 |

TABLE 3

| Number (% >) | Phosphor A Particle Diameter (μm) | Phosphor B Particle Diameter (μm) |
|---|---|---|
| 10.0 | 1.968 | 7.287 |
| 25.0 | 1.371 | 5.624 |
| 50.0 | 0.992 | 4.014 |
| 75.0 | 0.818 | 2.889 |
| 90.0 | 0.768 | 2.172 |

From the foregoing it will be appreciated that, although specific embodiments of the invention have been described herein for the purpose of illustration, various modifications may be made without deviating from the spirit and scope of the invention. Accordingly, the invention is not limited except as by the appended claims.

What is claimed is:

1. A method of manufacturing a luminescent phosphor with very small particle size, comprising mixing a host material selected from a yttrium compound and a gadolinium compound, a europium dopant and a liquid to form a slurry, and pulverizing the slurry to yield the luminescent phosphor having an average particle size of less than 3 microns and a luminescence of at least about 0.28 au, and then heating the luminescent phosphor at a temperature and for a period of time sufficient to yield a bright luminescent phosphor having a luminescence ranging from about 1 au to about 12 au.

2. The method of claim 1 wherein the luminescent phosphor is heated to a temperature ranging from about 1000° C. to about 1250° C.

3. The method of claim 1 wherein the luminescent phosphor is heated for a period of time ranging from about 1 hour to about 1.5 hours.

4. The method of claim 1 wherein the luminescent phosphor is heated at a temperature and for a period of time sufficient to yield a bright luminescent phosphor having a luminescence ranging from about 8 au to about 12 au.

5. A method of manufacturing a luminescent phosphor with very small particle size, comprising mixing a host material selected from a yttrium compound and a gadolinium compound, a europium dopant and a liquid to form a slurry, and pulverizing the slurry to yield a very fine luminescent phosphor having an average particle size of less than about 1 micron and a luminescence of at least about 0.28 au, and then heating the very fine luminescent phosphor at a temperature and for a period of time sufficient to yield a bright luminescent phosphor having a luminescence ranging from about 1 au to about 12 au.

6. The method of claim 5 wherein the very fine luminescent phosphor is heated to a temperature ranging from about 800° C. to about 1700° C.

7. The method of claim 5 wherein the very fine luminescent phosphor is heated to a temperature ranging from about 900° C. to about 1400° C.

8. The method of claim 5 wherein the very fine luminescent phosphor is heated to a temperature ranging from about 1000° C. to about 1250° C.

9. The method of claim 5 wherein the very fine luminescent phosphor is heated for a period of time ranging from about 30 minutes to about 4 hours.

10. The method of claim 5 wherein the very fine luminescent phosphor is heated for a period of time ranging from about 1 hour to about 1.5 hours.

11. The method of claim 5 wherein the very fine luminescent phosphor is heated at a temperature and for a period of time sufficient to yield a bright luminescent phosphor having a luminescence ranging from about 8 au to about 12 au.

12. The method of claim 5 wherein the very fine luminescent phosphor is heated at a temperature and for a period of time sufficient to yield a bright luminescent phosphor having a luminescence ranging from about 10 au to about 12 au and having a particle size of less than about 2 microns.

13. The method of claim 5 wherein the very fine luminescent phosphor is heated at a temperature and for a period of time sufficient to yield a bright luminescent phosphor having a luminescence ranging from about 10 au to about 12 au and having a particle size of less than about 1 micron.

14. The method of claim 1 wherein the host material is yttrium oxide.

15. The method of claim 1 wherein the host material is selected from oxide, yttrium oxysulfide, yttrium vanadate, gadolinium oxide and gadolinium oxysulfide.

16. The method of claim 1 wherein the europium dopant is europium oxide.

17. The method of claim 1 wherein the europium dopant is selected from europium oxide, europium nitrate, europium chloride, europium bromide, and europium iodide.

18. The method of claim 1 wherein the liquid is selected from water and an organic alcohol.

19. The method of claim 1 wherein the liquid is an organic alcohol selected from methanol, ethanol and isopropanol.

20. The method of claim 1 wherein the liquid is isopropanol.

21. The method of claim 1 wherein pulverization is performed in a high frequency vibrating mill.

22. The method of claim 1 wherein the host material and europium dopant are mixed in a host material:europium dopant weight ratio of about 10:0.5.

23. The method of claim 1 wherein the slurry is formed by mixing about 30 parts of liquid with about 10 parts of host material and europium dopant.

24. The method of claim 1 wherein the slurry has a Y:Eu atomic ratio of about 99:1 to about 85:15.

25. The method of claim 1 wherein the slurry has a Gd:Eu atomic ratio of about 99:1 to about 85:15.

26. The method of claim 5 wherein the host material is yttrium oxide.

27. The method of claim 5 wherein the host material is selected from yttrium oxide, yttrium oxysulfide, yttrium vanadate, gadolinium oxide and gadolinium oxysulfide.

28. The method of claim 5 wherein the europium dopant is europium oxide.

29. The method of claim 5 wherein the europium dopant is selected from europium oxide, europium nitrate, europium chloride, europium bromide, and europium iodide.

30. The method of claim 5 wherein the liquid is selected from water and an organic alcohol.

31. The method of claim 5 wherein the liquid is an organic alcohol selected from methanol, ethanol and isopropanol.

32. The method of claim 5 wherein the liquid is isopropanol.

33. The method of claim 5 wherein pulverization is performed in a high frequency vibrating mill.

34. The method of claim 5 wherein the host material and europium dopant are mixed in a host material:europium dopant weight ratio of about 10:0.5.

35. The method of claim 5 wherein the slurry is formed by mixing about 30 parts of liquid with about 10 parts of host material and europium dopant.

36. The method of claim 5 wherein the slurry has a Y:Eu atomic ratio of about 99:1 to about 85:15.

37. The method of claim 5 wherein the slurry has a Gd:Eu atomic ratio of about 99:1 to about 85:15.

* * * * *